United States Patent
Thoman

(10) Patent No.: US 9,638,355 B2
(45) Date of Patent: May 2, 2017

(54) SEAL GIRDING A STICK OF PIPE OR A PIPELINE IN THE ENTRY OR EXIT PORTS OF A PIPE FUSION CHAMBER

(71) Applicant: McElroy Manufacturing Inc., Tulsa, OK (US)

(72) Inventor: Timothy M. Thoman, Tulsa, OK (US)

(73) Assignee: McElroy Manufacturing, Inc., Tulsa, OK (US)

(*) Notice: Subject to any disclaimer, the term of this patent is extended or adjusted under 35 U.S.C. 154(b) by 894 days.

(21) Appl. No.: 14/029,580

(22) Filed: Sep. 17, 2013

(65) Prior Publication Data

US 2015/0076772 A1    Mar. 19, 2015

(51) Int. Cl.
| | |
|---|---|
| H05B 3/62 | (2006.01) |
| F16J 15/00 | (2006.01) |
| F16L 5/02 | (2006.01) |
| B29C 65/20 | (2006.01) |
| B29C 65/00 | (2006.01) |

(52) U.S. Cl.
CPC .......... *F16L 5/025* (2013.01); *B29C 65/2092* (2013.01); *B29C 66/0018* (2013.01); *B29C 66/1142* (2013.01); *B29C 66/5221* (2013.01); *B29C 66/71* (2013.01); *B29C 66/8414* (2013.01)

(58) Field of Classification Search
CPC ... F16J 15/00; F16J 15/16; F16J 15/32; H05B 3/00; H05B 3/62; B29C 66/00
USPC ...... 219/56–67, 520–537; 277/345–353, 500
See application file for complete search history.

(56) References Cited

U.S. PATENT DOCUMENTS

| | | | | | |
|---|---|---|---|---|---|
| 3,365,203 | A | * | 1/1968 | Wallis | F16J 3/00 138/125 |
| 4,219,203 | A | * | 8/1980 | Lovelace | B64G 1/58 277/637 |
| 5,014,917 | A | * | 5/1991 | Sirocky | B64G 1/50 239/265.11 |
| 5,427,387 | A | * | 6/1995 | Johnston | F16J 15/3244 277/559 |
| 8,083,234 | B2 | * | 12/2011 | Groom | F16C 29/08 277/345 |

FOREIGN PATENT DOCUMENTS

| | | |
|---|---|---|
| DE | 10 2008 050229 A1 | 4/2010 |
| DE | 10 2011 105446 A1 | 12/2012 |
| EP | 1 500 853 A1 | 1/2005 |
| JP | H08 187782 A | 7/1996 |
| JP | H10 122428 A | 5/1998 |

* cited by examiner

*Primary Examiner* — Michael LaFlame, Jr.
(74) *Attorney, Agent, or Firm* — Frank J. Catalano; Gable Gotwals

(57) ABSTRACT

A seal obstructs the migration of particulates and precipitation into a pipe fusion chamber through its pipe stick entry and pipeline exit passages. Sheets of cloth serially overlap the anticipated center axis of a pipe stick/pipeline which will pass through the machine. The outer edge of each sheet is pleated and fixed to a frame contiguous with the perimeter of the passage and the inner edge of each sheet is gathered on an elastic band. When a face of a pipe stick/pipeline pushes the sheets away from the frame, the pleats and bands cooperate to allow the inner edges of the sheets to slide over the face and hug substantially the entire outer circumference of the pipe stick/pipeline.

12 Claims, 9 Drawing Sheets

SEAL GIRDING A STICK OF PIPE OR A PIPELINE IN THE ENTRY OR EXIT PORTS OF A PIPE FUSION CHAMBER

BACKGROUND OF THE INVENTION

This invention relates generally to fusion of polyolefin pipe and more particularly concerns the integrity of the internal environment of fusion chambers used in "pipelining."

Heat fusion joining of sticks of plastic pipe to make a pipeline normally occurs in the field at the location where the pipeline will be installed, usually outdoors in an open or remote area with no protection from the elements. The heat fusion joining process requires keeping the pipe ends, facer and heater clean and dry because, if precipitation or blowing dirt and debris contaminate the joint, the integrity and strength of the joint are compromised. Furthermore, satisfactory fusion is directly and indirectly dependent on the temperature maintained within the fusion chamber. A climate-controlled environment is desirable simply because operator comfort during the fusion process facilitates better performance. It is necessary because in some environmental conditions the fusion process is likely not to produce a satisfactory result and the fusion process should not be performed.

In some known fusion processes, the fusion machine is kept stationary and a tent or makeshift tent like structure is used to cover the fusion machine and operator. The tent must be large enough to house the fusion machine and its operators and to allow for the heater and facer of the machine to swing into and out of the pipe path. The tent has openings to allow the pipe to enter and exit and to provide an escape for engine exhaust.

In other known fusion processes, the fusion machine is moved to make each fusion joint, a process known as "pipelining." It is not practical, however, to move the tent with the machine for each fusion operation. For "pipelining," the fusion machine is mounted in a climate controlled cab which travels on tracks and also incorporates some pipe handling apparatus. The cab has front and rear openings to allow the pipe sticks to enter and the fused pipe string to exit the cab. These openings have hinged doors that can be closed when no pipe stick or pipeline is in the openings, but during the fusion process the pipe stick and pipeline are in their respective openings. As a result, during the critical fusion time, the doors are left open, leaving a large opening around the pipe. Since the openings are sized for the largest pipe in the pipe range that the machine can fuse, when smaller pipe is being fused the opening around the pipe is larger.

For a pipe fusion machine to operate effectively within an environmentally controlled chamber, such as the cab of a self-propelled vehicle, it is important to seal the areas surrounding each pipe stick and the assembled pipeline at their respective entry or exit passages into or from the cab. The pipe-to-cab seal must minimize heat loss or gain in the climate-controlled air of the cab in cold or hot ambient conditions and also minimize the entry of airborne dirt and other contaminants and blowing rain, snow or sleet into the cab sufficiently to satisfy minimum fused joint standards.

Since pipe fusion machines are generally capable of handling pipes within a wide range of pipe outer diameters, it is desirable that the same seal be suitable for use with pipes of any diameter within a given fusion machine's range of diameters. At the same time, however, it is also desirable that the same seal be sufficient to close the entry or exit passage so as to preserve the cabin conditions even when no pipe stick or pipeline is extended through the entry or exit passages.

In order to keep the number of operators required by and for the fusion machine and process at a minimum, and to minimize the risk of damage to the pipe sticks or pipeline by untimely insertion into the seal, it is also desirable that the seal be passive so as to open or close without further operator interaction when the pipe stick or pipeline pushes against it on entry or is discharged from it on exit.

The issues above, including adequate climate and contaminant control for both the operator and the process, cost effectiveness of the fusion equipment package and minimization of the operator's tasks in performance of the fusion process, are not fully resolved, if at all, by known stationary and "pipelining" equipment and particularly by known pipeline seals.

SUMMARY OF THE INVENTION

In accordance with the invention, a seal is provided for obstructing migration of outside particulates and precipitation between the perimeter of a pipe passage of a pipe fusion chamber and a pipe passing through the passage. The pipe may be a pipe stick or a pipeline of any of various diameters within a selected range of diameters to be passed through a given seal.

A frame contiguous with a perimeter of the passage defines an opening which is preferably at least half again as great as a greatest diameter of pipe sticks/pipelines in the range to be passed.

Sheets of cloth each have an inner edge and an outer edge. The sheets of cloth, taken together in overlapping serial relationship about a perimeter of the opening, cover the opening with each of the inner edges of the sheets of cloth overlapping an anticipated center axis of a pipe stick/pipeline to be passed through the opening.

The inner edge of each sheet of cloth is preferably at least twice as long as a distance across the opening taken along its respective inner edge in its pipe stick/pipeline center axis overlapping condition. The outer edge of each sheet of cloth is pleated and fixed to the frame. The inner edge of each sheet of cloth is gathered on an elastic band. Each elastic band has a free state length equal to its respective distance across the opening and is elastically stretchable to the length of the cloth's inner edge. The ends of each elastic band are fixed to the frame at the points by which their lengths are determined. When the face of a pipe stick/pipeline to be passed through the seal is aligned on its anticipated center axis with the seal and pushes the overlapping sheets of cloth away from the frame, the pleats and the elastic band cooperate to allow the inner edges of the sheets of cloth to slide over the face and hug substantially the entire outer circumference of the pipe stick/pipeline.

The shape of the opening may be rounded or polygonal and, if polygonal, may be but is not limited to orthogonal. The preferred shape is orthogonal, most preferably square.

For a seal with a square opening, the opening has sides of length approximately 1.5 times the outer diameter of the largest diameter pipe to be passed through the chamber. Four rectangular sheets of cloth each have a length which is approximately twice the length of the sides of the opening and a width which is greater than half the length of the sides of the opening by approximately a quarter of the smallest pipe diameter to be passed through the chamber. The pleats in the outer edge of each of the sheets of cloth are spaced variably symmetrically distant from the center of the outer edge of the sheet.

Each of the sheets of cloth has its pleated edge fastened to a different side of the frame. The ends of its elastic band are fixed to opposite sides of the frame with the band substantially parallel to its respective pleated edge and its short edges fully extended on their respective opposite sides of the frame. Opposite sheets of cloth overlap each other by approximately half the outer diameter of the smallest diameter pipe of the range to be passed through the chamber.

The pleat spaces, the elasticity of the elastic bands and the opposite sheet overlaps are coordinated to permit the gathered edges of the sheets to substantially hug the circumference of any pipe within the range of diameters if the pipe is centrally disposed between the gathered edges.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

The present seal is useful for obstructing migration of outside particulates and precipitation into a pipe fusion chamber C in which pipe sticks S are being fused into a pipeline L. Pipe sticks S and pipelines L are hereinafter generically identified as pipes P when the disclosed information is equally applicable to both the sticks S and the pipeline P.

Figure 1:
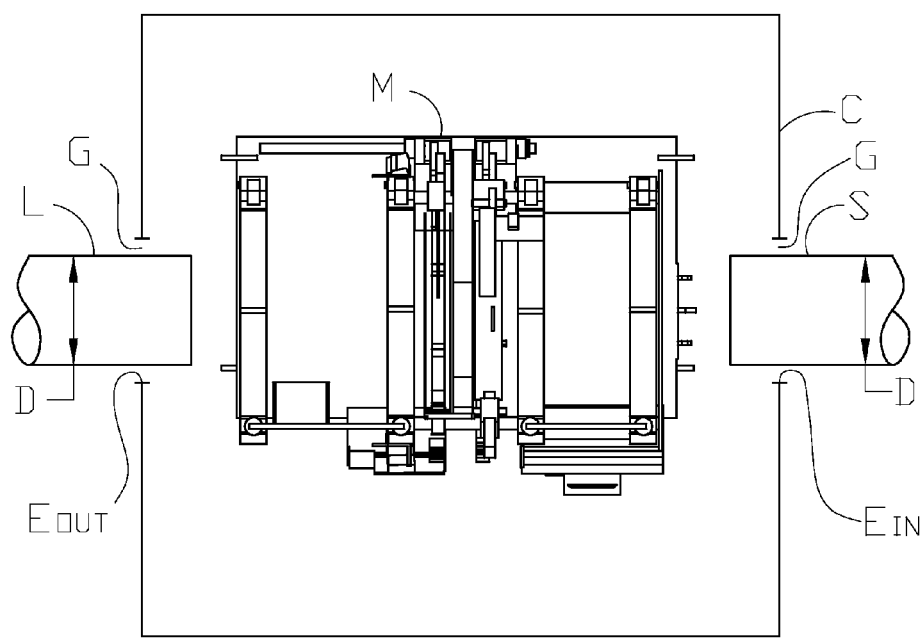
FIG. 1 is a block diagram illustrating a typical pipe fusion chamber.

Looking at FIG. 1, a fusion chamber C generally houses the pipe fusion machine M and its associated operating equipment and operator (not shown). Pipe P is fed to the fusion machine M in stick form S through an entry passage $E_{in}$ in one wall of the chamber C and exits the fusion machine M in pipeline form L through a pipeline exit passage $E_{out}$ in an opposite wall of the chamber C. From job to job, different diameters D of pipe P may be fused. The same fusion machine M will be used for a range of diameters D, all of which are accommodated by the same passages $E_{in}$ and $E_{out}$. The smaller the pipe diameter D, the greater the gap G between the circumference or outer wall W of the pipe P and the passages $E_{in}$ and $E_{out}$. Outside particulates and precipitation, as well as undesirably hot or cold air, can migrate through any gaps G, contaminating and/or causing climatic discomfort in the fusion environment in the chamber C.

Figure 2:
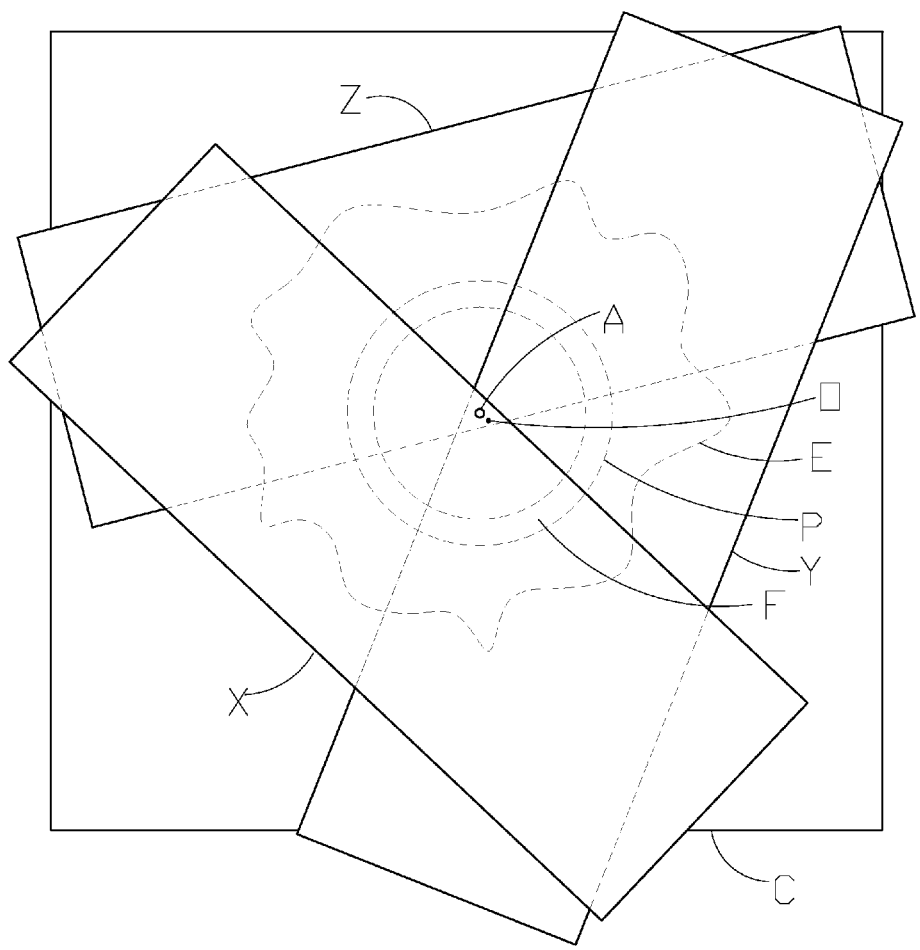
FIG. 2 is an elevation view illustrating the principles of the seal of the present invention.

Looking at FIG. 2, an end wall F of a pipe P with a central longitudinal axis A is positioned behind a randomly shaped passage E in a wall of the chamber C. Three sheets of cloth X, Y and Z are laid flat and overlapped to cover the entire passage E. The sheets of cloth X, Y and Z also provide a common overlap O around the central longitudinal axis A of the pipe P. While the entire passage E is covered by one or two of the sheets, the common overlap O of the three sheets X, Y and Z is small and preferably, but not necessarily, geometrically symmetrical about the axis A.

As used herein, "sheets of cloth" is intended to include any substantially flat and flexible material. Specific environmental conditions or application requirements will impact the selection of the material and its thickness. For example, in extreme cold, acrylic fabric will work well because it retains a high degree of flexibility.

Figure 3:
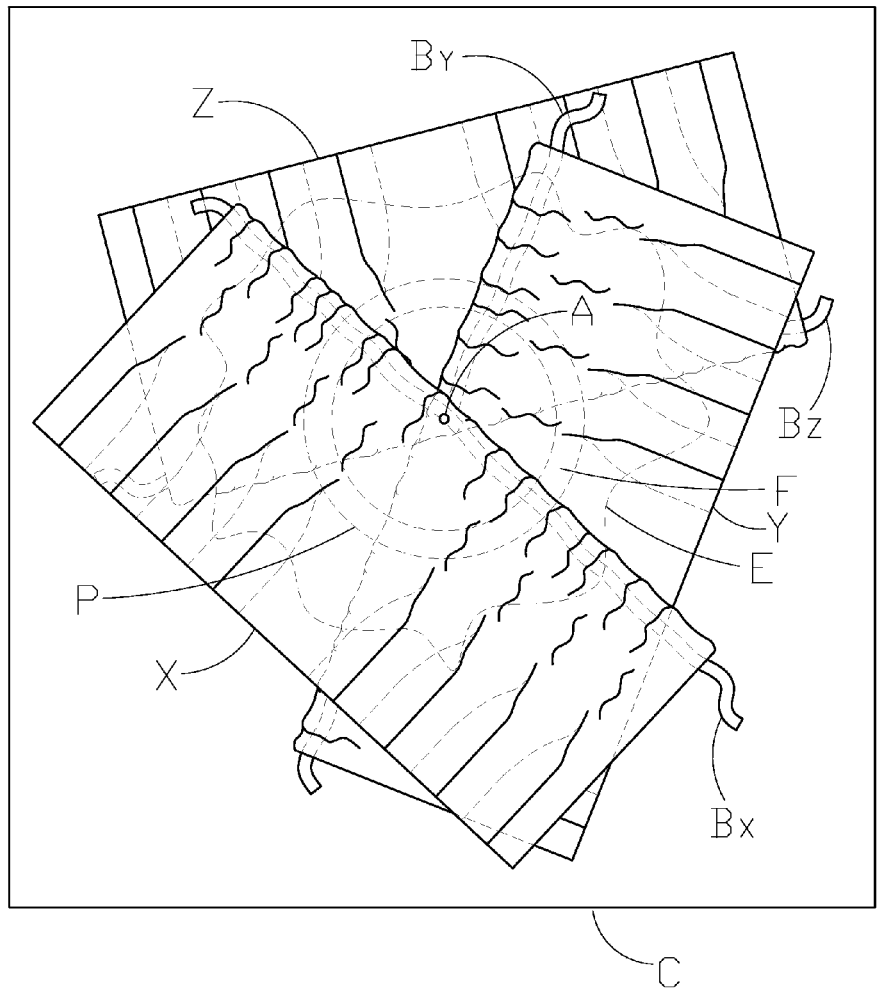
FIG. 3 is an elevation view illustrating the principles of the seal of the present invention.

Looking at FIG. 3, the sheets of cloth X, Y and Z which were shown flat in FIG. 2 have been pleated on their outer long edges but are still long enough to cover the passage E. Their inner long edges are gathered on elastic bands $B_X$, $B_Y$ and $B_Z$ which are stretched across the entire length of their respective inner edges but in a free state are reduced to a length substantially equal to the pleated lengths of the outer edges but sufficient to extend across the passage E. The pleating and gathering of the cloths X, Y and Z, as the pipe P pushes against the cloths, enable the overlap area O to be opened sufficiently wide for the pipe P to pass between them.

Figure 4:
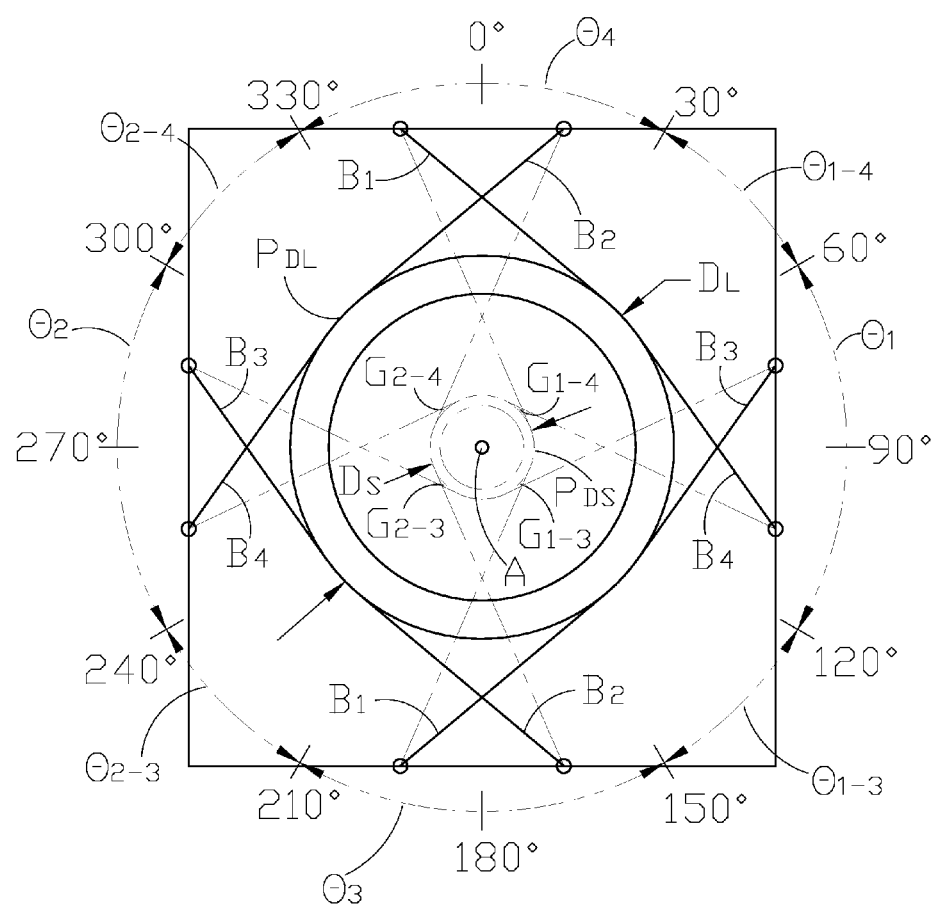
FIG. 4 is an elevation view illustrating the principles of the seal of the present invention.
Figure 5:
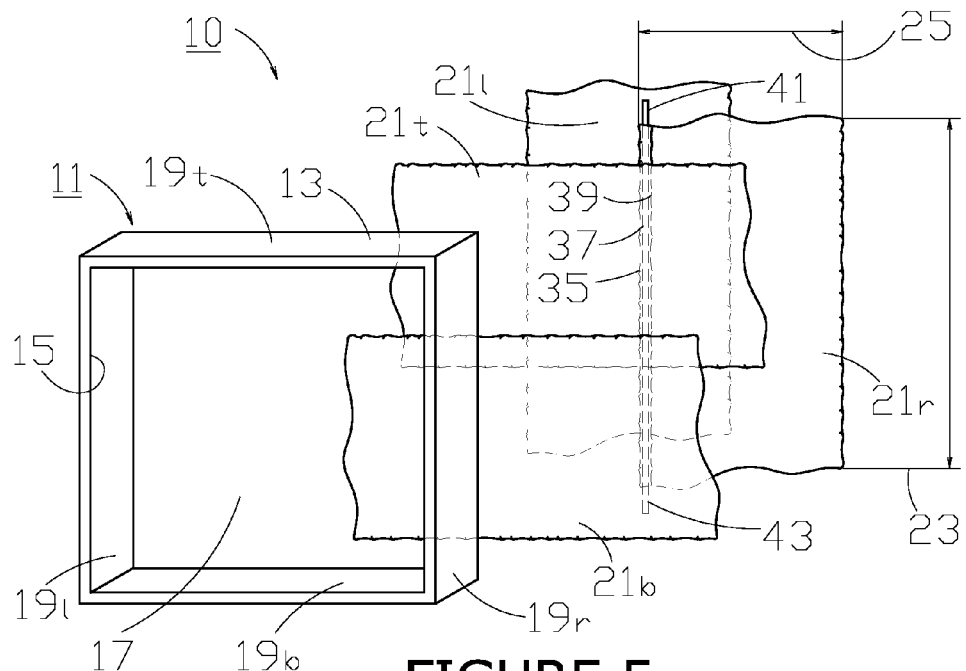
FIG. 5 is a perspective assembly view of a seal according to the invention.
Figure 6:
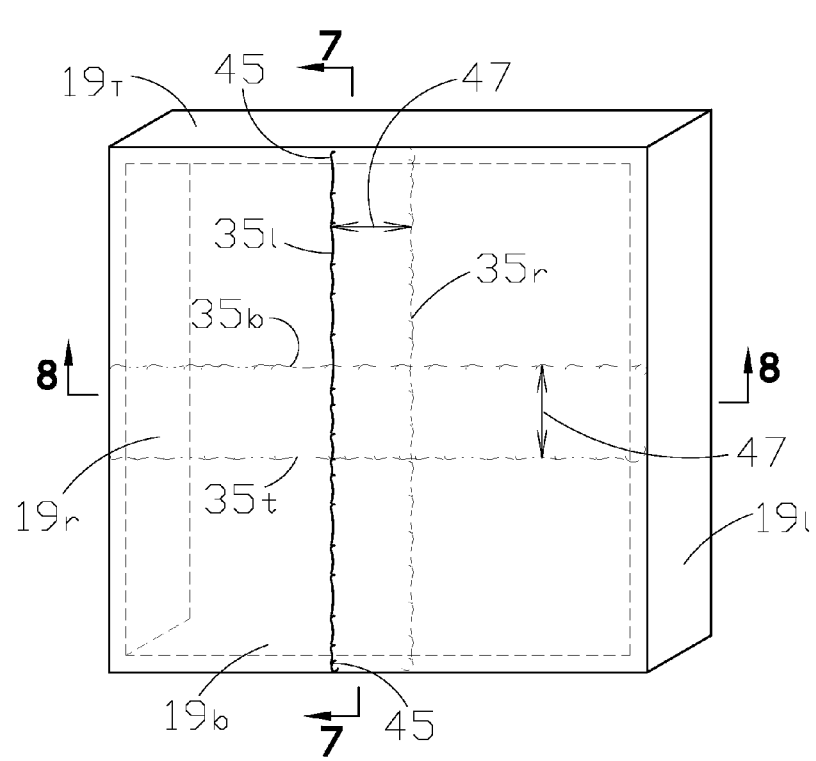
FIG. 6 is a perspective view of the seal of FIG. 5 fully assembled.
Figure 7:
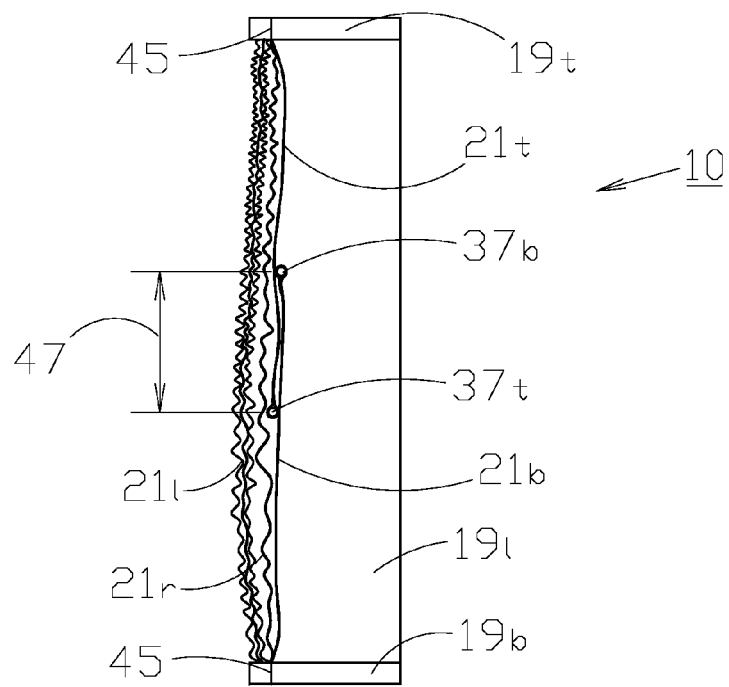
FIG. 7 is a cross-sectional view taken along the line 7-7 of FIG. 6.
Figure 8:
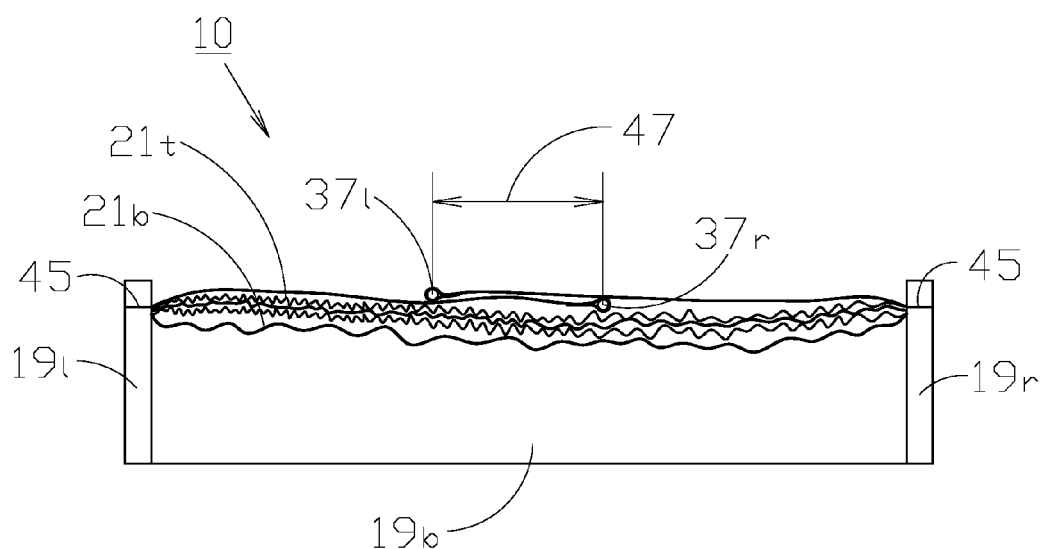
FIG. 8 is a cross-sectional view taken along the line 8-8 of FIG. 6.

Looking at FIG. 4, if a four sheet configuration of cloths were used to seal a passage E around a pipe, the inside long edges of the cloths would be gathered on elastic bands $B_1$, $B_2$, $B_3$ and $B_4$. The same configuration of cloths may be called upon to seal passages E for pipes P over a range of diameters D from a largest diameter $D_L$ of pipe $P_{DL}$ to a smallest diameter $D_S$ of pipe $P_{DS}$. In the example shown, the ends of the bands $B_1$, $B_2$, $B_3$ and $B_4$ are offset to cross at 0°, 90°, 180° and 270° in relation to the center axis A of the pipes $P_{DL}$ and $P_{DS}$. For the largest diameter pipe $P_{DL}$, the center portions of the bands $B_1$, $B_2$, $B_3$ and $B_4$ each contact a 60° portion of the pipe circumference, from 60°-120°, 150°-210°, 240°-300° and 330°-30°, totaling 240°. The remaining four 30° portions from 30-60°, 120°-150°, 210°-240° and 300°-330° are each contacted by two overlapping band portions $B_1$-$B_4$, $B_3$-$B_4$, $B_2$-$B_3$ and $B_4$-$B_2$, respectively. But, as seen in the example, for the smallest diameter pipe $P_{DS}$, the offsets of the ends of the bands $B_1$, $B_2$, $B_3$ and $B_4$ may not provide contact with all 360° of the circumference, leaving small gaps $G_1$-$G_4$, $G_1$-$G_3$, $G_2$-$G_3$ and $G_2$-$G_4$ along the circumference of the smallest diameter pipe $P_{DS}$. Thus, FIG. 4 demonstrates that the smaller the diameter of the smallest pipe $P_{DS}$, the more problematic might be the achievement of total circumferential pipe hugging.

Looking now at FIGS. 5-8, a preferred embodiment of the seal 10 is provided for obstructing outside particulates and precipitation from entry into a pipe fusion chamber C along the perimeters of pipe sticks S and a pipeline L at their respective entry and exit passages $E_{in}$ or $E_{out}$ to and from the fusion chamber C.

The seal 10 is identical for both the entry and exit passages $E_{in}$ and $E_{out}$. It includes a frame 11 with an outer perimeter 13 that is coincident with the entry or exit passage $E_{in}$ or $E_{out}$ in which it is installed. The preferred frame inner perimeter 15 shown defines a square opening 17, but perimeters of three or more sides, even if non-symmetrical, can be used. For example, four-sided frames need not necessarily be square or even orthogonal. For the square frame 11 shown, the opening 17 has sides 19 of length approximately 1.5 times the outer diameter of the largest diameter pipe stick S or pipeline L to be passed through the frame 11.

As shown, the square opening 17 is covered by four substantially rectangular overlapping sheets of cloth $21_b$, $21_t$, $21_r$ and $21_l$ fixed to the frame 11. In most applications, the number of sheets of cloth 21 used will correspond to the number of sides 19 of the frame 11 and the shapes of the sheets of cloth 21 will correspond to the shapes defined by the sides 19 of the frame 11 to which they will be attached, though not necessarily symmetrically, as will hereinafter be seen. The angular and linear dimensions of the sheets of cloth 21 will be empirically determined so that the overlapping sheets of cloth 21 will permit passage of the pipe P while substantially hugging the outer perimeter of pipe P over the entire range of diameters $D_S$-$D_L$ of pipe sticks S or pipelines L to be passed therebetween. "Substantially hugging" as used herein means that only the smallest diameter pipe $P_{DL}$ to be handled by a given seal may have gaps G in the contact of the circumference of the pipe P with the surrounding cloths 21, provided that the air pressure within the fusion chamber C is capable of impeding passage of particulates or precipitation through such gaps G.

Figure 9:
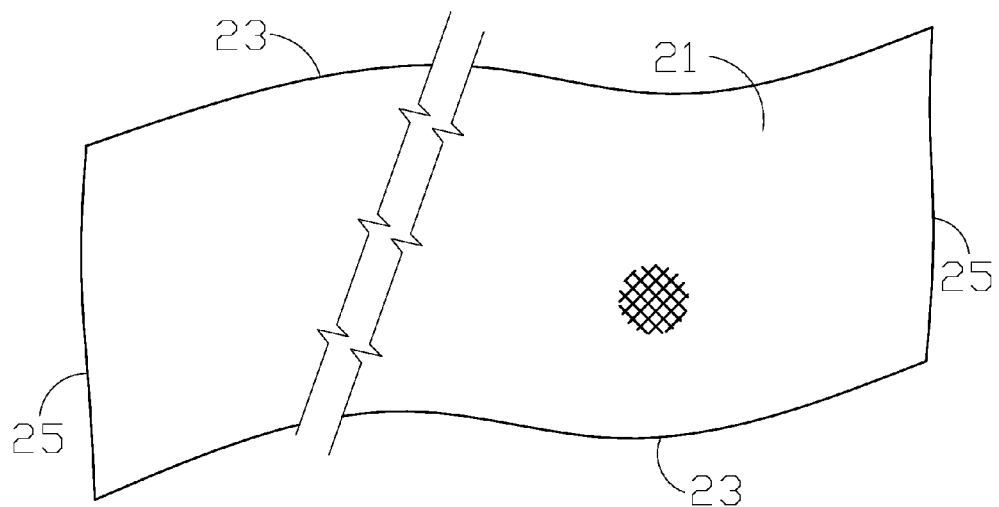
FIG. 9 is a plan view of a typical sheet of cloth to be used in the seal of FIG. 5.

Looking at FIG. 9, for the square frame 11 shown in FIGS. 5-8, each sheet of cloth 21 has a length 23 approximately twice the length of the sides 19 of the frame 11 and a width 25 approximately equal to the largest pipe outer diameter $D_L$ to be passed through the frame 11. The length 23 will vary depending on the elasticity of the cloth 21.

Figure 10:
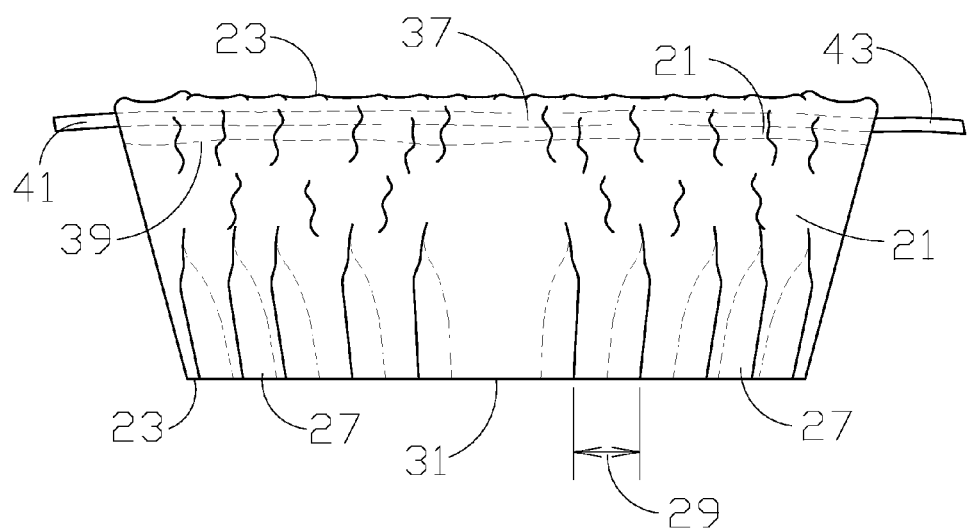
FIG. 10 is a plan view of the sheet of cloth of FIG. 9 after pleating and gathering for use in the seal of FIG. 5.

Looking at FIG. 10, each sheet of cloth 21 has pleats 27 at spaces 29 variably symmetrically distant from a center 31 of its long edge 23. The spacing of pleats in FIG. 3 is at consistent intervals on either side of the axis A. In FIG. 10, the spacing is decreased, preferably and as shown, symmetrically, from the center of the outer edges of the sheets of cloth toward, but short of, the extremities of the outer edges. Therefore, the bulk of available material in the sheets of cloth will be positioned to accommodate the portions of the pipe circumferences which are most problematic. The optimum number, spacing and location of the pleats 27 on the outboard edge 23 of the sheets of cloth 21 should be located so as to allow the fabric inner gathered edge 23 to expand and allow the pipe P to pass through. The pleats 27 fix the pleated long edge 23 at a length sufficient for the sheet 21 to overlap opposite sides 19 of the frame 11. The unpleated long edges 23 of the sheets of cloth $21_b$, $21_t$, $21_r$ and $21_l$ are hemmed and gathered on elastic bands $37_b$, $37_t$, $37_r$ and $37_l$, preferably of elastomeric material or surgical tubing, inside of their hems 39. The elastic bands 37 should be capable of elastically stretching to at least twice their unstretched length.

Returning to FIGS. 5-8, each sheet of cloth 21 has its pleated edge 23 fastened to a different side 19 of the frame 11 and has the ends 41 and 43 of its elastic band 37 fixed to opposite sides 19 of the frame 11 with the band 37 substantially parallel in an unstretched condition to its respective pleated edge 23. The short edges 25 of each sheet of cloth 21 are fully extended on their respective opposite sides 19 of the frame 11. Opposite ones $21_t$ and $21_b$ and $21_l$ and $21_r$ of the sheets of cloth 21 overlap each other 47 by approximately half of an outer diameter of a smallest diameter pipe $P_{DS}$ to be passed through the frame 11.

As explained in relation to FIG. 4, the points 45 at which the elastic bands 37 in the gathered edge hems 39 attach to the frame 11 determine the tangency points of the gathered edges 35 with the pipe P and, therefore, the amount of wrap achieved around the pipe P. The position of the pipe P in a passage E also affects the tangency points. Pipes P way off center would have better wrap in some areas and less in others, but they will be centered on the sheets of cloth 21 during the fusion process because they will be clamped in the fusion machine jaws (not shown). Only the smallest diameter pipe $P_{DS}$ of the range of pipe diameters could pose a problem. However, even if the overlap 47 does not provide complete closure on the circumference of the pipe P, small open areas will not make the seal design impractical if the internal chamber pressure is sufficient. Internal chamber pressure generally allows pressurized and filtered chamber air to flow out through the open ends of the pipe stick S or pipeline L and prevents dirty unheated or uncooled air from flowing into the chamber C through the pipe stick S or pipeline L. This pressure may be sufficient to also handle the gaps G along the pipe circumference. If not, the smallest diameter $D_S$ of the range $D_S$-$D_L$ should be increased accordingly. Alternatively, a seal with a greater number of overlapping sheets could be used.

Figure 11:
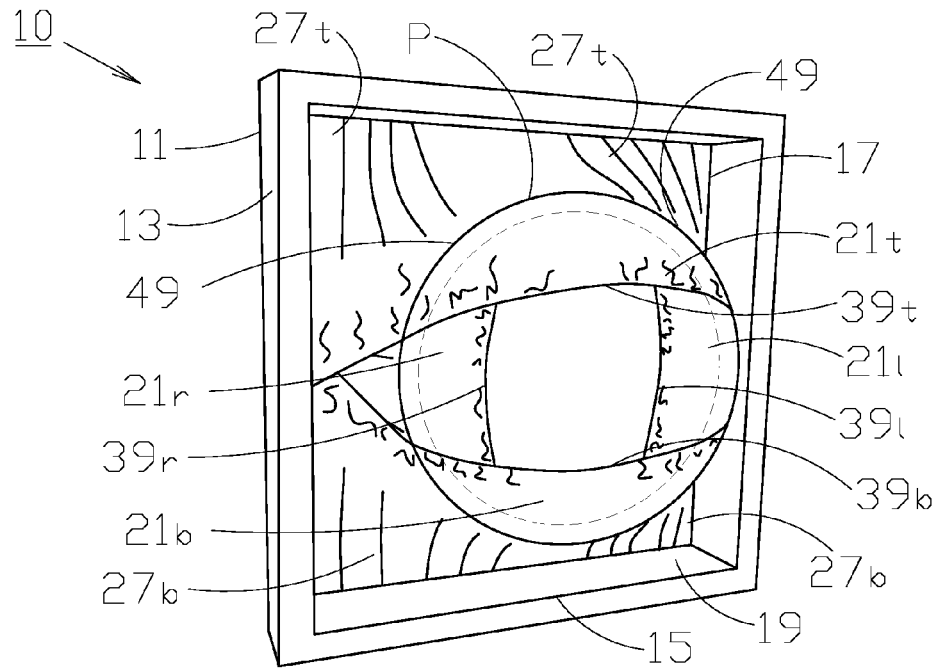
FIG. 11 is a perspective view of the seal of FIG. 6 with a large diameter pipe stick pushing against the sheets of the seal.
Figure 12:
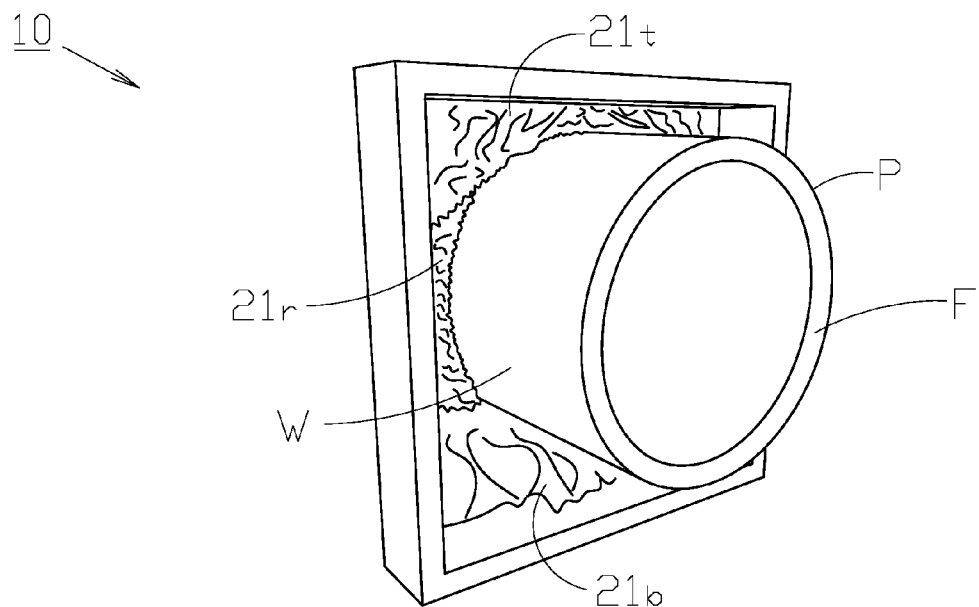
FIG. 12 is a perspective view of the seal of FIG. 6 with the large diameter pipe of FIG. 7 pushed between the sheets of cloth to create an opening in the seal.

As seen in FIG. 11 in which the pipe P is pushing against but not yet through the seal 10, the central portions of the sheets of cloth $21_b$, $21_t$, $21_r$ and $21_l$ do not expand much but "hinge" on the frame 11 and, as seen in FIG. 12, slide off the face F of the pipe P and onto the circumferential wall W of the pipe P. Greatest expansion is required at approximately the quarter points 49 of the pipe diameter and the need for expansion increases as the diameter increases. The greater the pipe diameter, the closer the quarter points 49 are to the frame inner perimeter 15. Therefore, as best seen in FIG. 10, a smaller space 29 between pleats 27 is preferred closer to the frame 11 and a greater space 29 between pleats 27 is preferred closer to the center 31.

The seal 10 is preferably passive so as to open or close without further interaction when the pipe stick S or pipeline L pushes against the seal 10 on entry or is discharged from the seal 10 on exit. It seals the entry or exit passage $E_{in}$ or $E_{out}$ even when no pipe stick S or pipeline L is in the passage. To increase the insulation effect of the seal 10, two sets of sheets of cloth 21 may be separated by an air gap.

Preferably, the outboard-most sheets of cloth $21_l$ and $21_r$ are lengthwise vertical so that if any precipitation is collected behind the outboard-most sheets $21_l$ and $21_r$, it will be discharged between the vertical sheets of cloth 21 and away from the fusion chamber C. Similarly, the more inboard sheets of cloth $21_t$ and $21_b$ are lengthwise horizontal with the lower horizontal sheet $21_b$ inward of the upper horizontal sheet $21_t$ to minimize the likelihood that collected precipitation will be able to pass into the fusion chamber C.

The spaces 29 between the pleats 27, the length and elasticity of the elastic bands 37 and the amount of overlap 47 of opposite sheets of cloth $21_t$ and $21_b$ and $21_l$ and $21_r$ are coordinated to permit the gathered edges 35 of the sheets of cloth 21 to hug entirely or, in the case of the smallest diameter pipe of the applicable range to hug substantially, the circumferential wall W of any pipe stick S or pipeline L having an outer diameter within a range between the largest and smallest outer diameters of pipe stick S or pipeline L to be passed through the seal 10, at least when the hugged pipe stick S or pipeline L is centrally disposed between the gathered edges 35. As noted above, satisfactory coordinated relationships of spacing, elasticity and overlap may be empirically determined.

Figure 13:
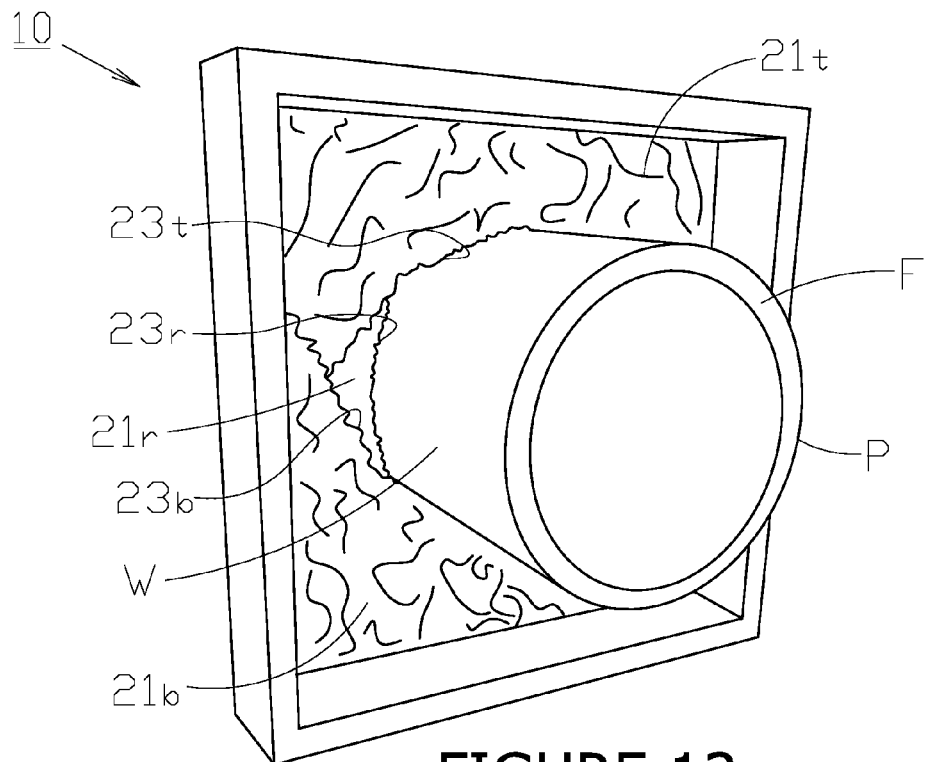
FIG. 13 is a perspective view of the seal of FIG. 6 with an intermediate diameter pipe pushed between the sheets of cloth to create an opening in the seal.
Figure 14:
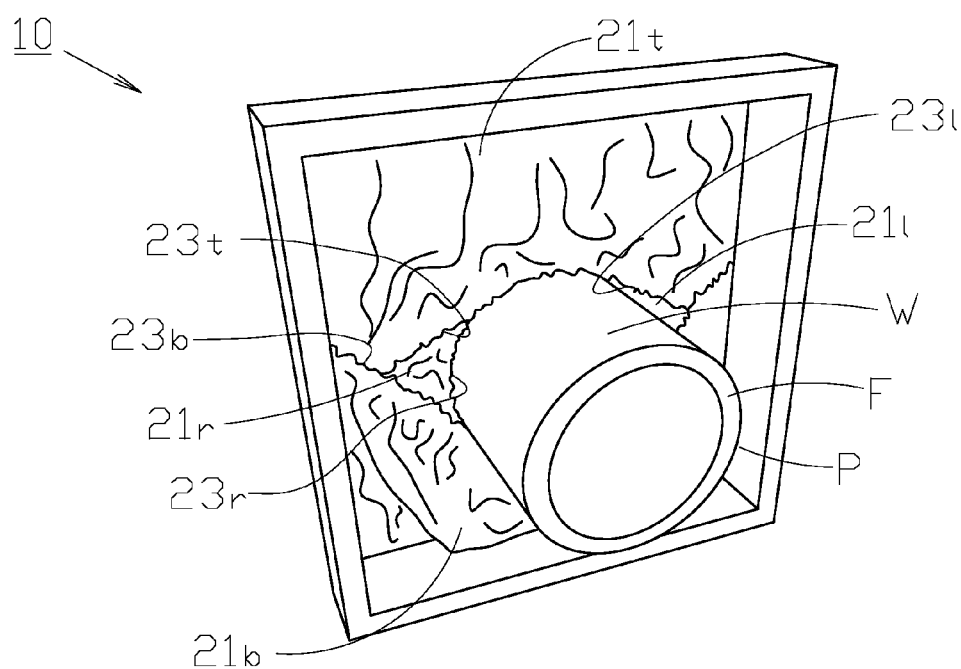
FIG. 14 is a perspective view of the seal of FIG. 6 with a small diameter pipe pushed between the sheets of cloth to create an opening in the seal.

FIGS. 12-14 show the pipe P after penetration through the seal 10 for pipes having a largest, intermediate and smallest outer diameter, respectively, for example in a range of 20" to 6". A satisfactory embodiment of the seal 10 has a frame 11 of inner perimeter 15 defining a square opening, perhaps 30" on each side. The cloth 21 used is an elastic fabric. Each sheet of cloth 21 has a length 23 of approximately 60" and a width 25 of approximately 20". The pleated edge 23 is approximately 34" long after pleating and is attached to opposite sides $19_t$ and $19_b$ and $19_l$ and $19_r$ of the frame 11. The short edges 25 of the cloths 21 are approximately 18.5" wide after hemming 39 and are attached to their respective opposite sides $19_t$ and $19_b$ or $19_l$ and $19_r$ of the frame 11. The hemmed edge 23 is gathered on a 30" length of surgical tubing 37 capable of elastically stretching to a length of 60" and the ends 41 and 43 of the tubing 37 are secured to the frame 11. The overlaps 47 of the gathered edges 35 of opposite sheets of cloth $21_t$ and $21_b$ or $21_l$ and $21_r$ are 3" wide. The 60" gathered edge 23 allows each sheet of cloth 21 to "stretch" and curve around any pipe stick S or pipeline L within the 6" to 20" outer diameter range. The overlaps 47 of the gathered edges $23_t$ and $23_b$ or $23_l$ and $23_r$ of the opposing sheet of cloth $21_t$ and $21_b$ or $21_l$ and $21_r$ help to facilitate an air seal between the pipe stick S or the pipeline L and the surrounding gathered edges 23 of cloths 21 when closed on any pipe stick S or pipeline L within the 6" to 20" outer diameter range.

Thus, it is apparent that there has been provided, in accordance with the invention, a pipe fusion chamber passage seal that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For obstructing migration of particulates and precipitation between a perimeter of a pipe stick/pipeline passage through a wall of a pipe fusion chamber and circumferential surfaces of pipe sticks/pipelines of various diameters within a selected range of diameters to be passed therethrough, a seal comprising:

a frame contiguous with a perimeter of the passage and defining an opening therein; and a plurality of sheets of cloth each having an inner edge and an outer edge, each of said inner edges, with said plurality of sheets of cloth taken together in overlapping serial relationship about a perimeter of said opening and covering said opening, overlapping an anticipated center axis of a pipe stick/pipeline to be passed through said opening; .

said inner edge of each said sheet of cloth being longer than a distance across said opening taken along its respective said inner edge in its said pipe stick/pipeline center axis overlapping condition;

said outer edge of each said sheet of cloth being pleated and fixed to said frame and said inner edge of each said sheet of cloth being gathered on an individual elastic band;

each said individual elastic band having a free state length equal to its respective said distance across said opening and being elastically stretchable to said length of its respective said inner edge, ends of each of said elastic bands being fixed to said frame at points determining said length thereof;

whereby, when a face of a pipe stick/pipeline to be passed through the seal is aligned on said anticipated center axis and pushes said plurality of sheets of cloth away from said frame, said pleats and said elastic band cooperate to allow said inner edges of said plurality of sheets of cloth to slide over the face and hug substantially the entire outer circumference of the pipe stick/pipeline.

2. A seal according to claim 1, said opening in said frame being at least half again as great as a greatest diameter of the selected range.

3. A seal according to claim 2, said inner edge of each said sheet of cloth being at least twice as long as a distance across said opening taken along its respective said inner edge in its said pipe stick/pipeline center axis overlapping condition.

4. A seal according to claim 1, said opening being polygonal.

5. A seal according to claim 1, said opening being orthogonal.

6. A seal according to claim 1, said opening being square.

7. A seal according to claim 6, said square opening having sides of length approximately 1.5 times an outer diameter of a largest diameter pipe to be passed through the chamber.

8. A seal according to claim 6, said plurality of sheets of cloth comprising four rectangular sheets of cloth each having a length approximately twice said length of said opening sides and each having a width greater than half said length of said opening sides by approximately a quarter of a smallest pipe diameter to be passed through said chamber.

9. A seal according to claim 8, each of said plurality of sheets of cloth having pleats at spaces variably symmetrically distant from a center of a long edge thereof.

10. A seal according to claim 9, each of said plurality of sheets of cloth having its said pleated edge fastened to a different side of said frame, having ends of its said elastic band fixed to opposite sides of said frame with said band substantially parallel to its respective said pleated edge and having a short edge fully extended on its respective opposite side of said frame.

11. A seal according to claim 10, opposite ones of said plurality of sheets of cloth overlapping each other by approximately half of an outer diameter of a smallest diameter pipe to be passed through the chamber.

12. A seal according to claim 11, said spaces of said pleats, an elasticity of said elastic bands and said overlapping of said opposite ones of said plurality of sheets being coordinated to permit said gathered edges of said sheets to hug a circumference of a pipe within a range of said largest and smallest outer diameters centrally disposed between said gathered edges.

* * * * *